(12) United States Patent
Fan

(10) Patent No.: US 11,925,825 B1
(45) Date of Patent: Mar. 12, 2024

(54) LINKAGE CONTROL SYSTEM AND LINKAGE CONTROL METHOD FOR BATTERY CLUSTERS

(71) Applicants: Shenzhen Hithium Energy Storage Technology Co., Ltd., Guangdong (CN); Xiamen Hithium Energy Storage Technology Co., Ltd., Fujian (CN)

(72) Inventor: Shangjie Fan, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/188,947

(22) Filed: Mar. 23, 2023

(30) Foreign Application Priority Data

Nov. 15, 2022 (CN) .......................... 202211423100.6

(51) Int. Cl.
*H01M 10/48* (2006.01)
*A62C 3/16* (2006.01)
*H01M 50/383* (2021.01)

(52) U.S. Cl.
CPC ............. *A62C 3/16* (2013.01); *H01M 10/482* (2013.01); *H01M 10/486* (2013.01); *H01M 50/383* (2021.01); *H01M 2200/10* (2013.01); *H01M 2200/20* (2013.01)

(58) Field of Classification Search
CPC .. H01M 50/383; H01M 50/38; H01M 10/486; A62C 3/16
See application file for complete search history.

(56) References Cited

U.S. PATENT DOCUMENTS

2020/0339010 A1\* 10/2020 Villanueva .......... H01M 50/249
2021/0053689 A1\* 2/2021 Lynn .................... H01M 10/617

FOREIGN PATENT DOCUMENTS

| CN | 106410298 A | 2/2017 |
|---|---|---|
| CN | 213642915 U | 7/2021 |
| CN | 113813542 A | 12/2021 |
| CN | 215691197 U | 2/2022 |

(Continued)

OTHER PUBLICATIONS

Machine Translation of: CN 21364915 U, Wang et al., Jul. 9, 2021.\*

(Continued)

*Primary Examiner* — Kenneth J Douyette
(74) *Attorney, Agent, or Firm* — IP Spring

(57) ABSTRACT

A linkage control system and a linkage control method for battery clusters are provided in the disclosure. In the system, when thermal runaway occurs in a certain battery cluster, in the condition that an inhibitor in an isolation-and-suppression device in the battery cluster is in a normal state, the control host can suppress thermal runaway of the battery cluster by the inhibitor in the isolation-and-suppression device. In the condition that the inhibitor in the isolation-and-suppression device is in an abnormal state, the control host can determine, from adjacent battery clusters, a battery cluster capable of supporting an inhibitor, to solve thermal runaway by the inhibitor in the isolation-and-suppression device in the battery cluster.

12 Claims, 4 Drawing Sheets

(56) References Cited

FOREIGN PATENT DOCUMENTS

JP        2014158508 A    9/2014
KR    20210056270 A    5/2021

OTHER PUBLICATIONS

Machine Translation of: CN 106410298 A, Duan et al., Feb. 15, 2017.*
CNIPA, Office Action for Chinese Patent Application No. 202211423100.6, dated Feb. 3, 2023, 22 pages.
CNIPA, Notification to Grant Patent Right for Invention for Chinese Patent Application No. 202211423100.6, dated Feb. 26, 2023, 3 pages.

* cited by examiner

LINKAGE CONTROL SYSTEM AND LINKAGE CONTROL METHOD FOR BATTERY CLUSTERS

CROSS-REFERENCE TO RELATED APPLICATIONS

This application claims priority under 35 U.S.C. § 119(a) to and the benefit of Chinese Patent Application No. 202211423100.6, filed Nov. 15, 2022, the entire disclosure of which is incorporated herein by reference.

TECHNICAL FIELD

This disclosure relates to the technical field of new energy battery, and particular to a linkage control system and a linkage control method for battery clusters.

BACKGROUND

With the development of new energy batteries, the importance of an energy storage technology in society is also greatly improved, and the frequency of using a large energy storage station, energy storage container, or the like is becoming higher and higher. Firefighting for energy storage is required to be focused on in the energy storage of the batteries. Once thermal runaway occurs in the energy storage container, a chain combustion reaction often occurs, causing fire spreading and increased damage. Currently, a total-flooding firefighting strategy is mostly adopted for the energy storage container, that is, a firefighting controller sends an alarm signal, and simultaneously switches on a valve of a suppression device to release gas to the container to solve thermal runaway. However, a suppression efficiency of this strategy is not high.

SUMMARY

In a first aspect of implementations in the disclosure, a linkage control system for battery clusters is provided. The system includes multiple detector modules, multiple isolation-and-suppression devices, and a control host. The multiple isolation-and-suppression devices are respectively disposed in the battery clusters, each of the multiple isolation-and-suppression devices is provided with a solenoid valve, and the multiple isolation-and-suppression devices are connected by a pipeline. The multiple detector modules are respectively mounted in the battery clusters, and each of the multiple detector modules is configured to detect environmental data of battery modules in a corresponding battery cluster and periodically report the environmental data. The control host is configured to determine a first target battery cluster in which thermal runaway occurs according to the environmental data, and determine whether an inhibitor in an isolation-and-suppression device A in the first target battery cluster is in a normal state, where when the inhibitor in the isolation-and-suppression device A is in an abnormal state, the control host is configured to determine a second target battery cluster in which an inhibitor is in the normal state from other battery clusters except the first target battery cluster, and switch on a solenoid valve of an isolation-and-suppression device B in the second target battery cluster to let the inhibitor in the isolation-and-suppression device B be conveyed to the first target battery cluster through the pipeline to solve thermal runaway.

The environmental data includes temperature data. In terms of determining the second target battery cluster in which the inhibitor is in the normal state from the other battery clusters except the first target battery cluster, the control host is specifically configured to: for each battery cluster among the other battery clusters except the first target battery cluster, obtain a probability of thermal runaway of said each battery cluster in a next period based on temperature data of said each battery cluster in a current period and temperature data of said each battery cluster in a historical period; obtain a confidence score for an isolation-and-suppression device in said each battery cluster supporting the first target battery cluster, according to the probability of thermal runaway of said each battery cluster in the next period, and a pipeline length between the isolation-and-suppression device in said each battery cluster and a spraying device for the inhibitor in the first target battery cluster; and determine a battery cluster in which an inhibitor is in the normal state and which has a lowest confidence score among the other battery clusters except the first target battery cluster, as the second target battery cluster.

In terms of obtaining the probability of thermal runaway of said each battery cluster in the next period based on the temperature data of said each battery cluster in the current period and the temperature data of said each battery cluster in the historical period, the control host is specifically configured to: predict temperature data of said each battery cluster in the next period by using the temperature data of said each battery cluster in the current period and the temperature data of said each battery cluster in the historical period; and obtain the probability of thermal runaway of said each battery cluster in the next period based on the temperature data of said each battery cluster in the next period and a first preset temperature value, where the first preset temperature value is a battery self-heating temperature T1.

In a second aspect of implementations in the disclosure, a linkage control system for battery clusters is provided. The system includes a detecting module, a first determining module, a second determining module, and a controlling module. The detecting module is configured to detect environmental data of battery modules in a corresponding battery cluster and periodically report the environmental data. The first determining module is configured to determine a first target battery cluster in which thermal runaway occurs according to the environmental data, and determine whether an inhibitor in an isolation-and-suppression device A in the first target battery cluster is in a normal state. When the inhibitor in the isolation-and-suppression device A in the first target battery cluster is in an abnormal state, the second determining module is configured to determine a second target battery cluster in which an inhibitor is in the normal state from other battery clusters except the first target battery cluster. And the controlling module is configured to switch on a solenoid valve of an isolation-and-suppression device B in the second target battery cluster, to let the inhibitor in the isolation-and-suppression device B be conveyed to the first target battery cluster through a pipeline to solve thermal runaway.

The environmental data includes temperature data, and in terms of determining the second target battery cluster in which the inhibitor is in the normal state from the other battery clusters except the first target battery cluster, the controlling module is specifically configured to: for each battery cluster among the other battery clusters except the first target battery cluster, obtain a probability of thermal runaway of said each battery cluster in a next period based on temperature data of said each battery cluster in a current period and temperature data of said each battery cluster in a historical period; obtain a confidence score for an isolationand-suppression device in said each battery cluster supporting the first target battery cluster, according to the probability of thermal runaway of said each battery cluster in the next period, and a pipeline length between the isolation-and-suppression device in said each battery cluster and a spraying device for the inhibitor in the first target battery cluster; and determine a battery cluster in which an inhibitor is in the normal state and which has a lowest confidence score among the other battery clusters except the first target battery cluster, as the second target battery cluster.

In terms of obtaining the probability of thermal runaway of said each battery cluster in the next period based on the temperature data of said each battery cluster in the current period and the temperature data of said each battery cluster in the historical period, the controlling module is specifically configured to: predict temperature data of said each battery cluster in the next period by using the temperature data of said each battery cluster in the current period and the temperature data of said each battery cluster in the historical period; and obtain the probability of thermal runaway of said each battery cluster in the next period based on the temperature data of said each battery cluster in the next period and a first preset temperature value, where the first preset temperature value is a battery self-heating temperature T1.

In a third aspect of implementations in the disclosure, a linkage control method for battery clusters is provided. The method is applied to a linkage control system for battery clusters and includes the following. Environmental data sent by multiple detector modules and corresponding to multiple battery clusters is received periodically, where the multiple detector modules respectively correspond to the multiple battery clusters. A first target battery cluster in which thermal runaway occurs is determined according to the environmental data, and whether an inhibitor in an isolation-and-suppression device A in the first target battery cluster is in a normal state is determined. A second target battery cluster in which an inhibitor is in the normal state is determined from other battery clusters except the first target battery cluster, when the inhibitor in the isolation-and-suppression device A is in an abnormal state. And a solenoid valve of an isolation-and-suppression device B in the second target battery cluster is switched on, to let the inhibitor in the isolation-and-suppression device B be conveyed to the first target battery cluster through a pipeline to solve thermal runaway.

The environmental data includes temperature data, and determining the second target battery cluster in which the inhibitor is in the normal state from the other battery clusters except the first target battery cluster includes: for each battery cluster among the other battery clusters except the first target battery cluster, obtaining a probability of thermal runaway of said each battery cluster in a next period based on temperature data of said each battery cluster in a current period and temperature data of said each battery cluster in a historical period; obtaining a confidence score for an isolation-and-suppression device in said each battery cluster supporting the first target battery cluster, according to the probability of thermal runaway of said each battery cluster in the next period, and a pipeline length between the isolation-and-suppression device in said each battery cluster and a spraying device for the inhibitor in the first target battery cluster; and determining a battery cluster in which an inhibitor is in the normal state and which has a lowest confidence score among the other battery clusters except the first target battery cluster, as the second target battery cluster.

Obtaining the probability of thermal runaway of said each battery cluster in the next period based on the temperature data of said each battery cluster in the current period and the temperature data of said each battery cluster in the historical period includes: predicting temperature data of said each battery cluster in the next period by using the temperature data of said each battery cluster in the current period and the temperature data of said each battery cluster in the historical period; and obtaining the probability of thermal runaway of said each battery cluster in the next period based on the temperature data of said each battery cluster in the next period and a first preset temperature value, where the first preset temperature value is a battery self-heating temperature T1.

BRIEF DESCRIPTION OF THE DRAWINGS

In order to describe technical solutions of implementations in the disclosure or related art more clearly, the following will give a brief introduction to the accompanying drawings used for describing the implementations or the related art. Apparently, the accompanying drawings hereinafter described are some implementations of the disclosure. Based on these drawings, those of ordinary skill in the art can also obtain other drawings without creative effort.

Figure 1:
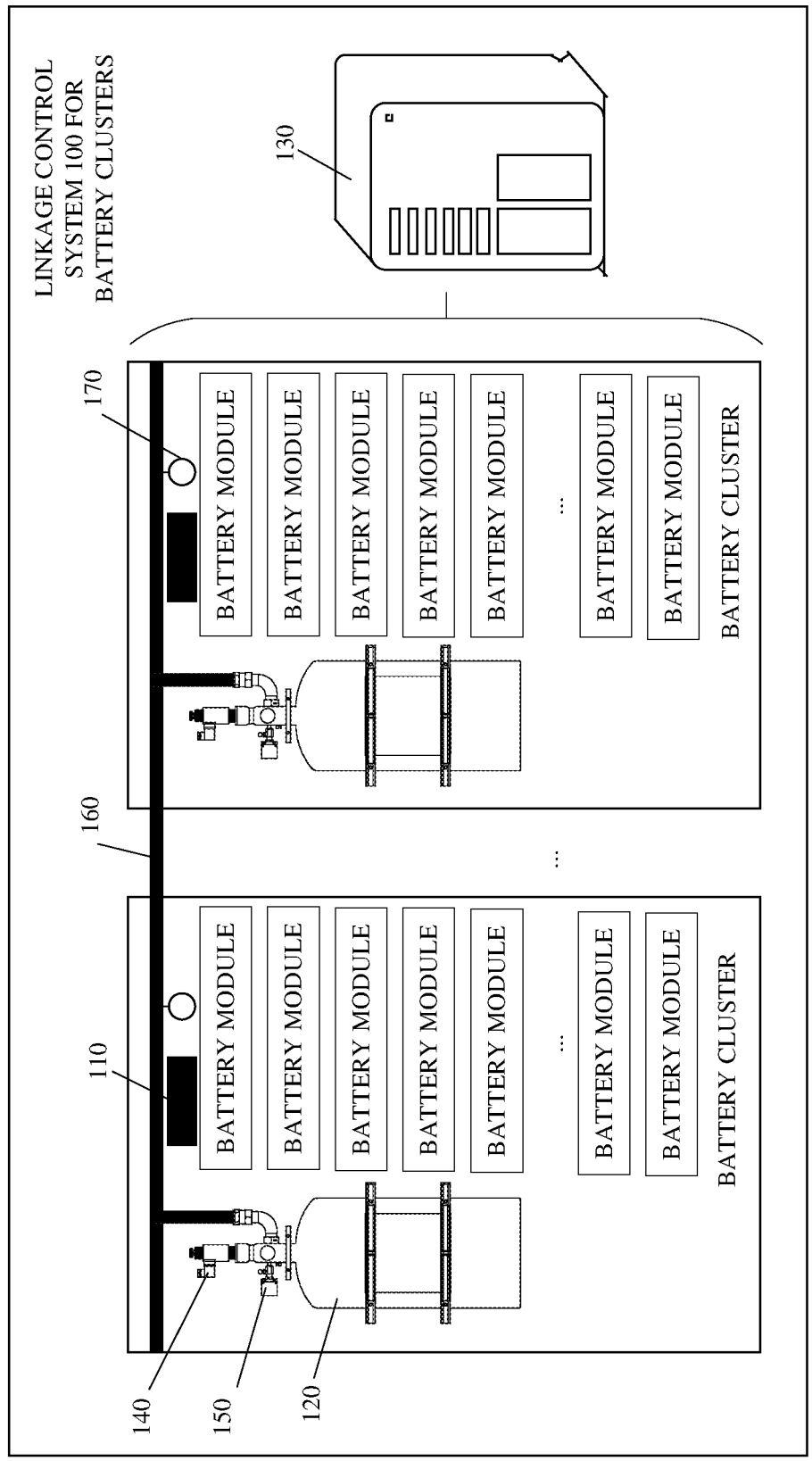
FIG. 1 is a schematic diagram of a linkage control system for battery clusters provided in implementations of the disclosure.

REFERENCE SIGNS linkage control system 100 for battery clusters, detector module 110, isolation-and-suppression device 120, control host 130, solenoid valve 140, pressure switch 150, pipeline 160, spraying device 170, detecting module 401, first determining module 402, second determining module 403, controlling module 404.

DETAILED DESCRIPTION

In order to enable those of ordinary skill in the art to better understand the technical solutions of the disclosure, technical solutions of implementations in the disclosure will be described clearly and comprehensively below with reference to the accompanying drawings in the implementations of the disclosure. Apparently, implementations described herein are merely some implementations rather than all implementations of the disclosure. Based on implementations in the disclosure, all other implementations obtained by those of ordinary skill in the art without creative effort shall fall within the protection scope of the disclosure.

The terms "include", "comprise", and "have" as well as variations thereof in the specification, the claims and the accompanying drawings of the disclosure, are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or apparatus can also be included. In addition, the terms "first", "second", "third" and the like are used to distinguish different objects rather than describe a particular order.

The term "implementation" or "embodiment" in the disclosure means that a particular feature, structure, or feature described in conjunction with the implementation may be contained in at least one implementation of the disclosure. The phrase appearing in various places in the specification does not necessarily refer to the same implementation, nor does it refer to an independent or alternative implementation that is mutually exclusive with other implementations. It is explicitly and implicitly understood by those of ordinary skill in the art that an implementation described in the disclosure may be combined with other implementations.

In order to facilitate understanding implementations of the disclosure, the specific technical problems to be solved in the disclosure are further analyzed and put forward below, and the related technical solutions of the disclosure are briefly introduced below.

In the related art, a total-flooding firefighting strategy of gas is generally adopted for an energy storage container. When a sensor (or detector) detects smoke and temperature signals, a firefighting controller sends an alarm signal, and a valve is switched on simultaneously to release gas to the energy storage container to solve thermal runaway. However, in an energy storage container, the inhibitor for thermal runaway is usually stored in one device, which makes it difficult for the total-flooding firefighting strategy to specifically suppress a certain battery cluster, and once the inhibitor fails to be activated, it is impossible to be sprayed. As a result, thermal runaway is unable to be solved for the energy storage container by the inhibitor. In this case, only other devices can be used, which makes a suppression efficiency low and increases a risk of fire spreading. In addition, in most of current firefighting systems, the inhibitor can only be sprayed once. When thermal runaway keeps continuous in a lithium battery, if the inhibitor is unable to be sprayed again, then it is difficult to prevent thermal runaway of the battery from keeping continuous. At the same time, the firefighting system generally starts to operate only when the sensor senses smoke and abnormal temperature. As a result, an effective prior protection is lacked, and it will be more difficult to suppress thermal runaway.

Considering the defects and deficiencies of the related art, a linkage control system and a linkage control method for battery clusters are provided in implementations of the disclosure. In this way, firefighting resources among different battery clusters can be invoked to suppress thermal runaway in time and centrally, and cluster-level linkage can be realized, thereby improving a suppression efficiency of thermal runaway in an energy storage container.

In a first aspect of implementations in the disclosure, a linkage control system for battery clusters is provided. The system includes multiple detector modules, multiple isolation-and-suppression devices, and a control host. The multiple isolation-and-suppression devices are respectively disposed in the battery clusters, each of the multiple isolation-and-suppression devices is provided with a solenoid valve, and the multiple isolation-and-suppression devices are connected by a pipeline. The multiple detector modules are respectively mounted in the battery clusters, and each of the multiple detector modules is configured to detect environmental data of battery modules in a corresponding battery cluster and periodically report the environmental data. The control host is configured to determine a first target battery cluster in which thermal runaway occurs according to the environmental data, and determine whether an inhibitor in an isolation-and-suppression device A in the first target battery cluster is in a normal state, where when the inhibitor in the isolation-and-suppression device A is in an abnormal state, the control host is configured to determine a second target battery cluster in which an inhibitor is in the normal state from other battery clusters except the first target battery cluster, and switch on a solenoid valve of an isolation-and-suppression device B in the second target battery cluster to let the inhibitor in the isolation-and-suppression device B be conveyed to the first target battery cluster through the pipeline to solve thermal runaway.

It can be seen that, in implementations of the disclosure, an inhibitor of an energy storage container is dispersed into each battery cluster, and flexibly arranged by using space of the clusters, so that volume of the inhibitor is reduced, space of the container body can be maximally utilized, thereby improving energy density of an energy storage system. When thermal runaway occurs in a certain battery cluster and an inhibitor in an isolation-and-suppression device in the battery cluster is in the abnormal state, the control host can determine, from other battery clusters (for example, adjacent battery clusters), a battery cluster capable of supporting an inhibitor, to solve thermal runaway by the inhibitor in the isolation-and-suppression device in the battery cluster. Thus, firefighting resources among clusters can be invoked and shared, fire spreading can be suppressed in time and centrally and controlled quickly, and spread of thermal runaway to battery devices of other clusters can be avoided. Simultaneously, situations like failure of timely supplement of an inhibitor, insufficient inhibitor or inhibitor failure in a single battery cluster can be prevented. Therefore, a suppression efficiency of the whole energy storage container can be improved.

In combination with the first aspect, in a possible implementation, said each of the multiple detector modules includes a detector group consisting of at least one of a temperature detector, a humidity detector, a smoke detector, or a gas detector. After the inhibitor in the isolation-and-suppression device B is conveyed to the first target battery cluster through the pipeline to solve thermal runaway, the control host is further configured to: set a data reading priority of a detector group in the first target battery cluster as a highest priority; read environmental data reported by the detector group in the first target battery cluster preferentially based on the data reading priority, when receiving multiple sets of environmental data reported by multiple detector groups; monitor whether thermal runaway of the first target battery cluster keeps continuous according to the environmental data reported by the detector group in the first target battery cluster; when thermal runaway of the first target battery cluster keeps continuous, determine a third target battery cluster in which an inhibitor is in the normal state from other battery clusters except the first target battery cluster and the second target battery cluster; and switch on a solenoid valve of an isolation-and-suppression device C in the third target battery cluster, to let the inhibitor in the isolation-and-suppression device C be conveyed to the first target battery cluster through the pipeline to solve thermal runaway.

In the implementation, after thermal runaway occurs in a certain battery cluster and is successfully suppressed, in order to facilitate continuous monitoring of the battery cluster, the control host may set a data reading priority of a detector group in the battery cluster as a highest priority, so as to read environmental data reported by the detector group preferentially in a next period, to determine whether thermal runaway keeps continuous. In the condition that thermal runaway keeps continuous, a battery cluster capable of supporting an inhibitor is re-determined from remaining battery clusters, so as to invoke the inhibitor in the battery cluster to prevent thermal runaway from keeping continuous. Therefore, available firefighting resources can be sequentially invoked to solve the problem that thermal runaway keeps continuous in the battery cluster.

In combination with the first aspect, in a possible implementation, the control host is further configured to switch on a solenoid valve of the isolation-and-suppression device A when the inhibitor in the isolation-and-suppression device A is in the normal state, to solve thermal runaway of the first target battery cluster by the inhibitor in the isolation-and-suppression device A. Said each of the multiple detector modules includes a detector group consisting of at least one of a temperature detector, a humidity detector, a smoke detector, or a gas detector, and after thermal runaway of the first target battery cluster is solved by the inhibitor in the isolation-and-suppression device A, the control host is further configured to: set a data reading priority of a detector group in the first target battery cluster as a highest priority; read environmental data reported by the detector group in the first target battery cluster preferentially based on the data reading priority, when receiving multiple sets of environmental data reported by multiple detector groups; monitor whether thermal runaway of the first target battery cluster keeps continuous according to the environmental data reported by the detector group in the first target battery cluster; and when thermal runaway of the first target battery cluster keeps continuous, determine the second target battery cluster from the other battery clusters except the first target battery cluster, and switch on the solenoid valve of the isolation-and-suppression device B in the second target battery cluster to let the inhibitor in the isolation-and-suppression device B be conveyed to the first target battery cluster through the pipeline to solve thermal runaway.

In the implementation, in the condition that the inhibitor in the battery cluster in which thermal runaway occurs is in the normal state, the control host suppresses thermal runaway of the battery cluster by the inhibitor, thereby realizing accurate suppression of a cluster-level. Meanwhile, compared with total-flooding spraying, suppression for a single cluster is beneficial to saving the inhibitor. In addition, after thermal runaway occurs in the battery cluster and is successfully suppressed, in order to facilitate continuous monitoring of the battery cluster, the control host may set a data reading priority of a detector group in the battery cluster as a highest priority, so as to read environmental data reported by the detector group preferentially in a next period, to determine whether thermal runaway keeps continuous. In the condition that thermal runaway keeps continuous, a battery cluster capable of supporting an inhibitor (for example, the second target battery cluster) is re-determined from remaining battery clusters (for example, adjacent battery clusters), so as to invoke the inhibitor in the battery cluster to prevent thermal runaway from keeping continuous.

In combination with the first aspect, in a possible implementation, the environmental data includes temperature data. In terms of determining the second target battery cluster in which the inhibitor is in the normal state from the other battery clusters except the first target battery cluster, the control host is specifically configured to: for each battery cluster among the other battery clusters except the first target battery cluster, obtain a probability of thermal runaway of said each battery cluster in a next period based on temperature data of said each battery cluster in a current period and temperature data of said each battery cluster in a historical period; obtain a confidence score for an isolation-and-suppression device in said each battery cluster supporting the first target battery cluster, according to the probability of thermal runaway of said each battery cluster in the next period, and a pipeline length between the isolation-and-suppression device in said each battery cluster and a spraying device for the inhibitor in the first target battery cluster; and determine a battery cluster in which an inhibitor is in the normal state and which has a lowest confidence score among the other battery clusters except the first target battery cluster, as the second target battery cluster.

In the implementation, the confidence score for the isolation-and-suppression device in each battery cluster supporting the battery cluster in which thermal runaway occurs is obtained, according to the probability of thermal runaway of each battery cluster among the other battery clusters in the next period, and the pipeline length between the isolation-and-suppression device in each battery cluster and a spraying device in the battery cluster in which thermal runaway occurs. And the battery cluster in which the inhibitor is in the normal state and which has the lowest confidence score is determined as a battery cluster capable of supporting an inhibitor. Therefore, a battery cluster in which an inhibitor is idler in the current period and the next period can be invoked to support thermal runaway suppression.

In combination with the first aspect, in a possible implementation, in terms of obtaining the probability of thermal runaway of said each battery cluster in the next period based on the temperature data of said each battery cluster in the current period and the temperature data of said each battery cluster in the historical period, the control host is specifically configured to: predict temperature data of said each battery cluster in the next period by using the temperature data of said each battery cluster in the current period and the temperature data of said each battery cluster in the historical period; and obtain the probability of thermal runaway of said each battery cluster in the next period based on the temperature data of said each battery cluster in the next period and a first preset temperature value, where the first preset temperature value is a battery self-heating temperature T1.

In the implementation, the control host predicts the temperature data of each battery cluster among the other battery clusters in the next period, and obtains the probability of thermal runaway of each battery cluster in the next period based on the temperature data in the next period and the first preset temperature value. An inhibitor of a battery cluster with a high probability is likely to be used for thermal runaway suppression for current cluster in next periods, and generally will not be included in a list of firefighting resources that can be invoked.

In combination with the first aspect, in a possible implementation, the control host is further configured to: determine whether thermal runaway occurs in said each battery cluster based on the temperature data of said each battery cluster in the current period and the first preset temperature value; and when no thermal runaway occurs in said each battery cluster, obtain the probability of thermal runaway of said each battery cluster in the next period based on the temperature data of said each battery cluster in the current period and the temperature data of said each battery cluster in the historical period; or when thermal runaway occurs in a battery cluster among the other battery clusters except the first target battery cluster in the current period, filter out the battery cluster in which thermal runaway occurs, and determine the second target battery cluster from remaining battery clusters.

In the implementation, if it is determined, based on the temperature data in the current period and the first preset temperature value, that thermal runaway occurs in a battery cluster among the other battery clusters (for example, adjacent battery clusters), then the battery cluster is filtered out, to avoid occupying the firefighting resource of the battery cluster.

In combination with the first aspect, in a possible implementation, the control host is further configured to: generate a first-level early warning signal, when temperature data in the current period of the battery cluster in which thermal runaway occurs is greater than or equal to the first preset temperature value and less than a second preset temperature value; generate a second-level early warning signal, when the temperature data in the current period of the battery cluster in which thermal runaway occurs is greater than or equal to the second preset temperature value and less than a third preset temperature value, where the second preset temperature value is a trigger temperature T2 of thermal runaway, and the third preset temperature value is a maximum temperature T3 during thermal runaway; or generate a third-level early warning signal, when the temperature data in the current period of the battery cluster in which thermal runaway occurs is greater than or equal to the third preset temperature value.

In the implementation, different early warning signals are generated based on different temperature data in the current period of the battery cluster in which thermal runaway occurs, so as to adopt different solutions.

In combination with the first aspect, in a possible implementation, said each of the multiple isolation-and-suppression devices is provided with a pressure switch, and the control host is further configured to: obtain pressure data reported by the pressure switch; and determine that an inhibitor in a corresponding isolation-and-suppression device is in the normal state, when the pressure data is greater than or equal to a preset pressure value; or determine that the inhibitor in the corresponding isolation-and-suppression device is in the abnormal state, when the pressure data is less than the preset pressure value.

In the implementation, the control host can determine whether the inhibitor in the corresponding isolation-and-suppression device is in the normal state according to the pressure data reported by the pressure switch. When the inhibitor in the corresponding isolation-and-suppression device is in the normal state, the inhibitor in the isolation-and-suppression device can be adopted to solve thermal runaway; when the inhibitor in the corresponding isolation-and-suppression device is in the abnormal state, an inhibitor in an isolation-and-suppression device in an adjacent battery cluster can be invoked to solve thermal runaway, so as to avoid a situation where the inhibitor fails to be activated and is unable to be sprayed.

In a second aspect of implementations in the disclosure, a linkage control system for battery clusters is provided. The system includes a detecting module, a first determining module, a second determining module, and a controlling module. The detecting module is configured to detect environmental data of battery modules in a corresponding battery cluster and periodically report the environmental data. The first determining module is configured to determine a first target battery cluster in which thermal runaway occurs according to the environmental data, and determine whether an inhibitor in an isolation-and-suppression device A in the first target battery cluster is in a normal state. When the inhibitor in the isolation-and-suppression device A in the first target battery cluster is in an abnormal state, the second determining module is configured to determine a second target battery cluster in which an inhibitor is in the normal state from other battery clusters except the first target battery cluster. And the controlling module is configured to switch on a solenoid valve of an isolation-and-suppression device B in the second target battery cluster, to let the inhibitor in the isolation-and-suppression device B be conveyed to the first target battery cluster through a pipeline to solve thermal runaway.

It should be noted that the system in the second aspect is a software system corresponding to the system in the above first aspect. For specific implementation details and beneficial effects, reference can be made to the above first aspect.

In a third aspect of implementations in the disclosure, a linkage control method for battery clusters is provided. The method is applied to a linkage control system for battery clusters and includes the following. Environmental data sent by multiple detector modules and corresponding to multiple battery clusters is received periodically, where the multiple detector modules respectively correspond to the multiple battery clusters. A first target battery cluster in which thermal runaway occurs is determined according to the environmental data, and whether an inhibitor in an isolation-and-suppression device A in the first target battery cluster is in a normal state is determined. A second target battery cluster in which an inhibitor is in the normal state is determined from other battery clusters except the first target battery cluster, when the inhibitor in the isolation-and-suppression device A is in an abnormal state. And a solenoid valve of an isolation-and-suppression device B in the second target battery cluster is switched on, to let the inhibitor in the isolation-and-suppression device B be conveyed to the first target battery cluster through a pipeline to solve thermal runaway.

It should be noted that the method in the third aspect is corresponding to the system in the above second aspect. For specific implementation details and beneficial effects, reference can be made to the above second aspect.

In a fourth aspect of implementations in the disclosure, a computer readable storage medium is provided. The computer readable storage medium is configured to store a computer program, which executed by a device to realize the method described in any one of the above third aspect.

Reference is made to FIG. 1, which is a schematic diagram of a linkage control system for battery clusters provided in implementations of the disclosure. As illustrated in FIG. 1, the linkage control system 100 for battery clusters includes multiple detector modules 110, multiple isolation-and-suppression devices 120, and a control host 130. The multiple isolation-and-suppression devices 120 are respectively disposed in the battery clusters (it should be understood that a battery module is stored in an energy storage container in the form of battery clusters, and an energy storage container generally includes multiple battery clusters). Each isolation-and-suppression device 120 is provided with a solenoid valve 140 and a pressure switch 150, the multiple isolation-and-suppression devices 120 are connected with one another by a pipeline 160, and a spraying device 170 is disposed in a pipeline segment in each battery cluster. A dosage of an inhibitor stored in each isolation-and-suppression device 120 is a dosage of an inhibitor for a single cluster.

The multiple detector modules 110 are respectively mounted in the battery clusters, and each of the multiple detector modules is configured to detect environmental data of battery modules in a corresponding battery cluster and periodically report the environmental data. Each detector module 110 at least can be used for detecting temperature, smoke and combustible gas, then the environmental data includes, but is not limited to, temperature data, smoke data, and combustible gas data, that is, the environmental data reported by the detector module 110 in each battery cluster in each period can be represented by a vector. Further, each detector module 110 also has a data analysis function. When any one of the environmental data reaches a data threshold value, the detector module 110 also sends an alarm signal to the control host 130, so that the control host 130 generates an early warning signal and controls an alarm to perform a linkage alarm.

The control host 130 is configured to determine a first target battery cluster in which thermal runaway occurs according to the environmental data. Alternatively, the environmental data may carry a location identifier of each battery cluster in the energy storage container. The control host 130 analyzes the environmental data, and if it is determined that certain environmental data includes abnormal data caused by thermal runaway, then the control host 130 can determine the first target battery cluster in which thermal runaway occurs according to a location identifier in the environmental data. Alternatively, the environmental data may carry a device identifier of the detector module 110, and the control host 130 stores an association relationship between each device identifier and a location identifier of a corresponding battery cluster in the energy storage container. The control host 130 analyzes the environmental data, and if it is determined that certain environmental data includes abnormal data caused by thermal runaway, then the control host 130 can determine the first target battery cluster in which thermal runaway occurs according to an association relationship between a device identifier and a location identifier in the environmental data. For example, if a location identifier of battery cluster 1 is $location_{ij}$, and a device identifier of the detector module 110 in battery cluster 1 is $C_1$, then the control host 130 can determine a battery cluster in which thermal runaway occurs and a location of the battery cluster based on the association relationship $C_1$-$location_{ij}$, where i and j respectively represent a row position and a column position of the battery cluster in the energy storage container.

The control host 130 is further configured to determine whether an inhibitor in an isolation-and-suppression device A in the first target battery cluster is in a normal state. Exemplarily, the control host 130 is specifically configured to: obtain pressure data reported by the pressure switch 150 of each isolation-and-suppression device 120; analyze each pressure data; and when pressure data reported by a pressure switch 150 of a corresponding isolation-and-suppression device 120 (for example, the isolation-and-suppression device A) is greater than or equal to a preset pressure value, determine that an inhibitor in the isolation-and-suppression device is in the normal state (in general, only an inhibitor in the normal state can be activated successfully); or when the pressure data is less than the preset pressure value, determine that the inhibitor in the isolation-and-suppression device is in the abnormal state (for example, situations like no inhibitor, insufficient inhibitor or inhibitor failure). The preset pressure value may be 90% of designed storage pressure of the isolation-and-suppression device 120. In the implementation, the control host 130 can determine whether the inhibitor in the corresponding isolation-and-suppression device is in the normal state according to the pressure data reported by the pressure switch 150. When the inhibitor in the corresponding isolation-and-suppression device is in the normal state, the inhibitor in the isolation-and-suppression device can be adopted to solve thermal runaway; when the inhibitor in the corresponding isolation-and-suppression device is in the abnormal state, an inhibitor in an isolation-and-suppression device 120 in other battery clusters can be invoked to solve thermal runaway, so as to avoid a situation where the inhibitor fails to be activated and is unable to be sprayed.

The control host 130 is further configured to switch on a solenoid valve 140 of the isolation-and-suppression device A when the inhibitor in the isolation-and-suppression device A is in the normal state, to solve thermal runaway of the first target battery cluster by the inhibitor in the isolation-and-suppression device A; or when the inhibitor in the isolation-and-suppression device A is in the abnormal state, the control host 130 is further configured to determine a second target battery cluster in which an inhibitor is in the normal state from other battery clusters except the first target battery cluster, and switch on a solenoid valve 140 of an isolation-and-suppression device B in the second target battery cluster to let the inhibitor in the isolation-and-suppression device B be conveyed to the first target battery cluster through the pipeline 160 to solve thermal runaway.

It can be seen that, in implementations of the disclosure, an inhibitor of the energy storage container is dispersed into each battery cluster, and flexibly arranged by using space of the clusters, so that volume of the inhibitor is reduced, space of the container body can be maximally utilized, thereby improving energy density of an energy storage system. When thermal runaway occurs in a certain battery cluster and an inhibitor in an isolation-and-suppression device 120 in the battery cluster is in the abnormal state, the control host 130 can determine, from other battery clusters (for example, adjacent battery clusters), a battery cluster capable of supporting an inhibitor, to solve thermal runaway by the inhibitor in the isolation-and-suppression device 120 in the battery cluster. Thus, firefighting resources among clusters can be invoked and shared, fire spreading can be suppressed in time and centrally and controlled quickly, and spread of thermal runaway to battery devices of other clusters can be avoided. Simultaneously, situations like failure of timely supplement of an inhibitor, insufficient inhibitor or inhibitor failure in a single battery cluster can be prevented. Therefore, a suppression efficiency of the whole energy storage container can be improved.

Exemplarily, each of the multiple detector modules includes a detector group consisting of at least one of a temperature detector, a humidity detector, a smoke detector, or a gas detector. After the inhibitor in the isolation-and-suppression device B is conveyed to the first target battery cluster through the pipeline to solve thermal runaway, the control host 130 is further configured to: set a data reading priority of a detector group in the first target battery cluster as a highest priority; read environmental data reported by the detector group in the first target battery cluster preferentially based on the data reading priority, when receiving multiple sets of environmental data reported by multiple detector groups; monitor whether thermal runaway of the first target battery cluster keeps continuous according to the multidimensional environmental data reported by the detector group in the first target battery cluster; when thermal runaway of the first target battery cluster keeps continuous, determine a third target battery cluster in which an inhibitor is in the normal state from other battery clusters except the first target battery cluster and the second target battery cluster; and switch on a solenoid valve 140 of an isolation-and-suppression device C in the third target battery cluster, to let the inhibitor in the isolation-and-suppression device C be conveyed to the first target battery cluster through the pipeline 160 to solve thermal runaway. Specifically, after the fire in the first target battery cluster is suppressed, the control host 130 sets the data reading priority of the detector group in the first target battery cluster as the highest priority, and reads the environmental data reported by the detector group in the first target battery cluster preferentially in a next period based on the data reading priority, to determine whether thermal runaway of the first target battery cluster keeps continuous. When thermal runaway of the first target battery cluster keeps continuous, the control host 130 determines the third target battery cluster from the other battery clusters except the first target battery cluster and the second target battery cluster; and in the condition that the inhibitor in the isolation-and-suppression device C in the third target battery cluster is in the normal state, invokes the inhibitor to solve thermal runaway of the first target battery cluster. In the implementation, after thermal runaway occurs in a certain battery cluster and is successfully suppressed, in order to facilitate continuous monitoring of the battery cluster, the control host 130 may set a data reading priority of a detector group in the battery cluster as a highest priority, so as to read environmental data reported by the detector group preferentially in a next period, to determine whether thermal runaway keeps continuous. In the condition that thermal runaway keeps continuous, a battery cluster capable of supporting an inhibitor is re-determined from remaining battery clusters, so as to invoke the inhibitor in the battery cluster to prevent thermal runaway from keeping continuous. Therefore, available firefighting resources can be sequentially invoked to solve the problem that thermal runaway keeps continuous in the battery cluster.

Exemplarily, after thermal runaway of the first target battery cluster is solved by the inhibitor in the isolation-and-suppression device A, the control host 130 is further configured to: set a data reading priority of a detector group in the first target battery cluster as a highest priority; read environmental data reported by the detector group in the first target battery cluster preferentially based on the data reading priority, when receiving multiple sets of environmental data reported by multiple detector groups; monitor whether thermal runaway of the first target battery cluster keeps continuous according to the environmental data reported by the detector group in the first target battery cluster; and when thermal runaway of the first target battery cluster keeps continuous, determine the second target battery cluster in which the inhibitor is in the normal state from the other battery clusters except the first target battery cluster, and switch on the solenoid valve 140 of the isolation-and-suppression device B in the second target battery cluster to let the inhibitor in the isolation-and-suppression device B be conveyed to the first target battery cluster through the pipeline 160 to solve thermal runaway. Specifically, after thermal runaway of the first target battery cluster is suppressed, the inhibitor in the isolation-and-suppression device A may be insufficient to prevent thermal runaway from keeping continuous. Thus, when monitoring that thermal runaway of the first target battery cluster keeps continuous, the control host 130 determines the second target battery cluster in which the inhibitor is in the normal state from the other battery clusters except the first target battery cluster, to solve thermal runaway of the first target battery cluster by the inhibitor in the second target battery cluster.

In the implementation, in the condition that the inhibitor in the battery cluster in which thermal runaway occurs is in the normal state, the control host 130 suppresses thermal runaway of the battery cluster by the inhibitor, thereby realizing accurate suppression of a cluster-level. Meanwhile, compared with total-flooding spraying, suppression for a single cluster is beneficial to saving the inhibitor. In addition, after thermal runaway occurs in the battery cluster and is successfully suppressed, in order to facilitate continuous monitoring of the battery cluster, the control host 130 may set a data reading priority of a detector group in the battery cluster as a highest priority, so as to read environmental data reported by the detector group preferentially in a next period, to determine whether thermal runaway keeps continuous. In the condition that thermal runaway keeps continuous, a battery cluster capable of supporting an inhibitor (for example, the second target battery cluster) is re-determined from remaining battery clusters (for example, adjacent battery clusters), so as to invoke the inhibitor in the battery cluster to prevent thermal runaway from keeping continuous.

Exemplarily, in terms of determining the second target battery cluster in which the inhibitor is in the normal state from the other battery clusters except the first target battery cluster, the control host 130 is specifically configured to: for each battery cluster among the other battery clusters except the first target battery cluster, obtain a probability of thermal runaway of each battery cluster in a next period based on temperature data of each battery cluster in a current period and temperature data of each battery cluster in a historical period; obtain a confidence score for an isolation-and-suppression device 120 in each battery cluster supporting the first target battery cluster, according to the probability of thermal runaway of each battery cluster in the next period, and a pipeline length between the isolation-and-suppression device 120 in each battery cluster and a spraying device 170 for the inhibitor in the first target battery cluster; and determine a battery cluster in which an inhibitor is in the normal state and which has a lowest confidence score among the other battery clusters except the first target battery cluster, as the second target battery cluster.

Specifically, assuming that the current period is the i-th period, then the historical period may be implemented as k periods before the i-th period, in terms of obtaining the probability of thermal runaway of each battery cluster in the next period based on the temperature data of each battery cluster in the current period and the temperature data of each battery cluster in the historical period, the control host 130 is specifically configured to: predict temperature data of each battery cluster in the next period by using the temperature data of each battery cluster in the current period and the temperature data of each battery cluster in the historical period; and obtain the probability of thermal runaway of each battery cluster in the next period of after current period based on the temperature data of each battery cluster in the next period and a first preset temperature value, where the first preset temperature value is a battery self-heating temperature T1.

Figure 2:
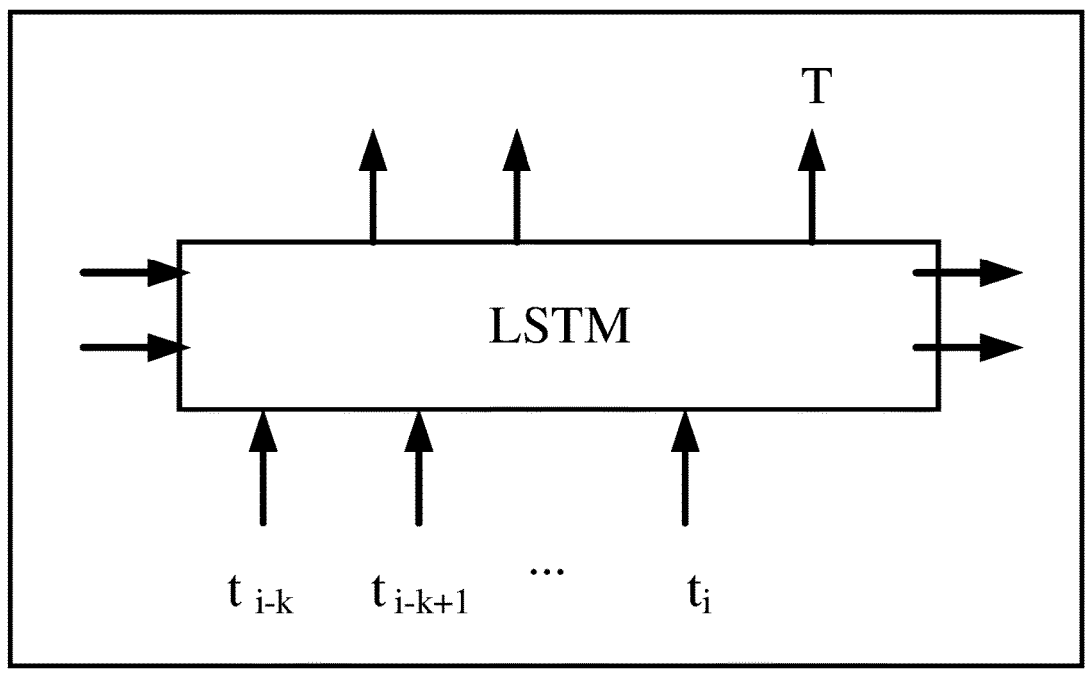
FIG. 2 is a schematic diagram illustrating a process of obtaining temperature data of adjacent battery clusters in a next period provided in implementations of the disclosure.

Referring to FIG. 2, the control host 130 uses temperature data $t_{i-k}$ in the (i-k)-th period, temperature data $t_{i-k+1}$ in the (i-k+1)-th period . . . , and temperature data $t_i$ in the i-th period as input data for a long short term memory (LSTM) model, predicts temperature data T in the next period, and calculates the probability of thermal runaway of each battery cluster in the next period by using the following formula:

$$\text{probability} = 1 - |-T1|/100 \quad (1)$$

In formula (1), probability represents the probability of thermal runaway of each battery cluster in the next period, which means that the closer temperature data of each battery cluster in a period is to T1, the higher the probability of thermal runaway. In the implementation, the control host 130 predicts the temperature data of each battery cluster among the other battery clusters in the next period, and obtains the probability of thermal runaway of each battery cluster in the next period based on the temperature data in the next period and the first preset temperature value. An inhibitor of a battery cluster with a high probability is likely to be used for thermal runaway suppression for current cluster in next periods, and generally will not be included in a list of firefighting resources that can be invoked.

The confidence score for the isolation-and-suppression device 120 in above each battery cluster supporting the first target battery cluster is calculated by using the following formula:

$$\text{score} = \alpha * \text{length} + \beta * \text{probability} \quad (2)$$

In formula (2), score represents the confidence score, length represents the pipeline length between the isolation-and-suppression device 120 in each battery cluster and the spraying device 170 in the first target battery cluster, and $\alpha$ and $\rho$ each represent a preset weight. $\alpha$ is usually taken as a constant of 1, $\beta$ is greater than $\alpha$, that is, in the case of small difference in pipeline lengths, it is considered that the probability of thermal runaway of each battery cluster in the next period is a more important parameter index than the pipeline length between the isolation-and-suppression device 120 in each battery cluster and the spraying device 170 in the first target battery cluster.

Figure 3:
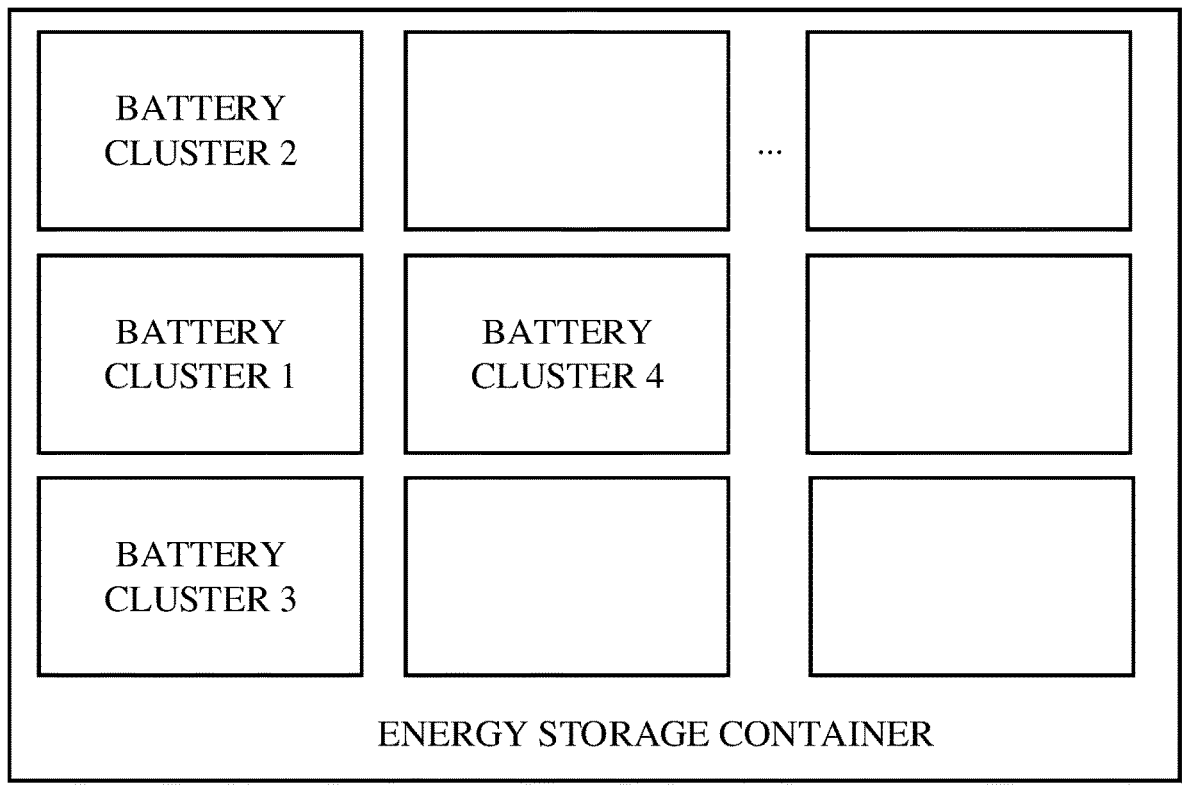
FIG. 3 is a schematic diagram of adjacent battery clusters provided in implementations of the disclosure.

The control host 130 is further configured to rank multiple adjacent battery clusters in ascending order according to the confidence score, and determine a first adjacent battery cluster in the sequence as the second target battery cluster. As illustrated in FIG. 3, multiple adjacent battery clusters of battery cluster 1 are battery cluster 2, battery cluster 3 and battery cluster 4. Based on the layout of each battery cluster in the energy storage container, a pipeline length between an isolation-and-suppression device 120 in battery cluster 2 and the spraying device 170 in battery cluster 1, a pipeline length between an isolation-and-suppression device 120 in battery cluster 3 and the spraying device 170 in battery cluster 1, and a pipeline length between an isolation-and-suppression device 120 in battery cluster 4 and the spraying device 170 in battery cluster 1 have no great difference therebetween. Thus, the higher a probability of thermal runaway of a battery cluster, the higher a confidence score of the battery cluster. If a confidence score of battery cluster 2 is greater than a confidence score of battery cluster 4, and the confidence score of battery cluster 4 is greater than a confidence score of battery cluster 3, then battery cluster 3 is determined as the second target battery cluster. In the implementation, the confidence score for the isolation-and-suppression device 120 in each battery cluster supporting the battery cluster in which thermal runaway occurs is obtained, according to the probability of thermal runaway of each battery cluster in the next period after the current period, and the pipeline length between the isolation-and-suppression device 120 in each battery cluster and a spraying device 170 in the battery cluster in which thermal runaway occurs. And the battery cluster with the lowest confidence score is determined as a battery cluster capable of supporting an inhibitor. Therefore, a battery cluster in which an inhibitor is idler in the current period and the next period can be invoked to support thermal runaway suppression.

Exemplarily, the control host 130 is further configured to: determine whether thermal runaway occurs in each battery cluster based on the temperature data of each battery cluster in the current period and the first preset temperature value; and when no thermal runaway occurs in each battery cluster, obtain the probability of thermal runaway of each battery cluster in the next period based on the temperature data of each battery cluster in the current period and the temperature data of each battery cluster in the historical period; or when thermal runaway occurs in a battery cluster among the other battery clusters except the first target battery cluster in the current period, filter out the battery cluster in which thermal runaway occurs, and determine the second target battery cluster from remaining battery clusters. Specifically, when temperature data of a certain battery cluster in the current period reaches the first preset temperature value, the control host 130 determines that thermal runaway occurs in a battery module of the battery cluster. For example, in FIG. 3, when thermal runaway occurs in battery cluster 3, it is considered that an inhibitor in the isolation-and-suppression device 120 in battery cluster 3 may be used for thermal runaway suppression for battery cluster 3 at any time. Therefore, battery cluster 3 is filtered out, and the second target battery cluster is selected from battery cluster 2 and battery cluster 4. In the implementation, if it is determined, based on the temperature data in the current period and the first preset temperature value, that thermal runaway occurs in a battery cluster among the other battery clusters (for example, adjacent battery clusters), then the battery cluster is filtered out, to avoid occupying the firefighting resource of the battery cluster.

Exemplarily, the control host 130 is further configured to: generate a first-level early warning signal, when temperature data in the current period of the battery cluster in which thermal runaway occurs is greater than or equal to the first preset temperature value and less than a second preset temperature value; generate a second-level early warning signal, when the temperature data in the current period of the battery cluster in which thermal runaway occurs is greater than or equal to the second preset temperature value and less than a third preset temperature value, where the second preset temperature value is a trigger temperature T2 of thermal runaway, and the third preset temperature value is a maximum temperature T3 during thermal runaway; or generate a third-level early warning signal, when the temperature data in the current period of the battery cluster in which thermal runaway occurs is greater than or equal to the third preset temperature value. The early-warning grades of the first-level early warning signal, the second-level early warning signal, and the third-level early warning signal increase in sequence. The first-level early warning signal is used for controlling the alarm to perform a sound-and-light linkage alarm. The second-level early warning signal is used for instructing the pressure switch 150 of the isolation-and-suppression device 120 in the battery cluster in which thermal runaway occurs, to immediately report the pressure data in real time. The third-level early warning signal is used for counting down to switching on the solenoid valve 140 of the isolation-and-suppression device 120 in the battery cluster in which thermal runaway occurs, and prompting the personnel to evacuate. In the implementation, different early warning signals are generated based on different temperature data in the current period of the battery cluster in which thermal runaway occurs, so as to adopt different solutions.

Figure 4:
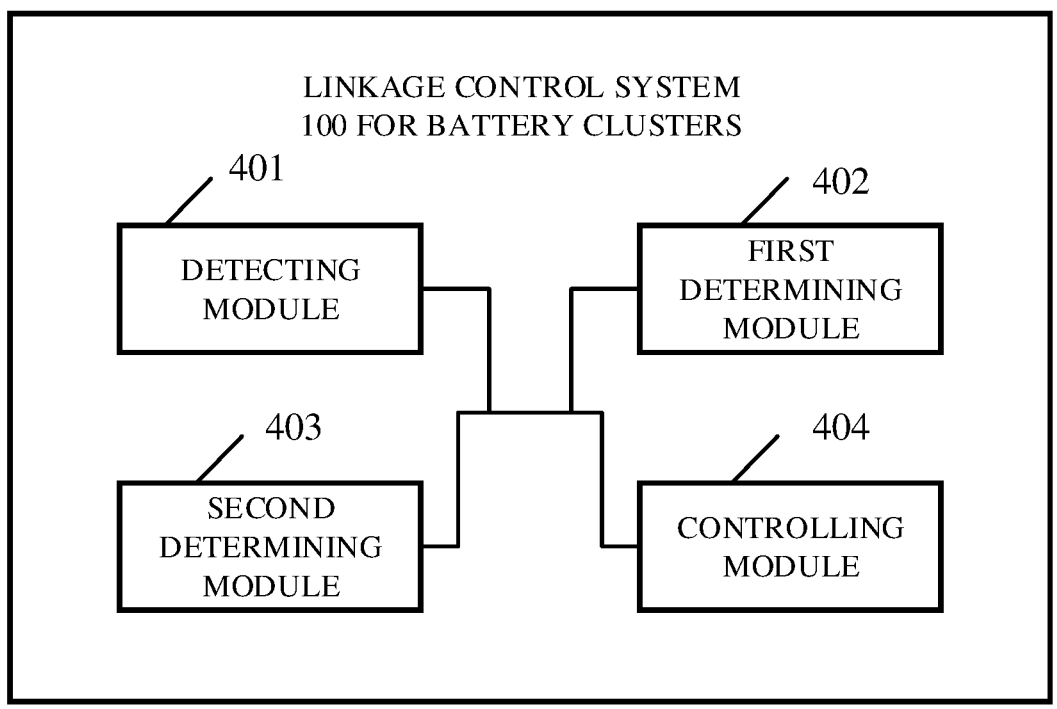
FIG. 4 is a schematic diagram of another linkage control system for battery clusters provided in implementations of the disclosure.

Reference is made to FIG. 4, which is a schematic diagram of another linkage control system for battery clusters provided in implementations of the disclosure. As illustrated in FIG. 4, the linkage control system 100 for battery clusters includes a detecting module 401, a first determining module 402, a second determining module 403, and a controlling module 404.

The detecting module 401 is configured to detect environmental data of battery modules in a corresponding battery cluster and periodically report the environmental data.

Exemplarily, the detecting module 401 can detect the environmental data of the battery modules in the corresponding battery cluster through at least one of a temperature detector, a humidity detector, a smoke detector, or a gas detector.

The first determining module 402 is configured to determine a first target battery cluster in which thermal runaway occurs according to the environmental data, and determine whether an inhibitor in an isolation-and-suppression device A in the first target battery cluster is in a normal state.

When the inhibitor in the isolation-and-suppression device A in the first target battery cluster is in an abnormal state, the second determining module 403 is configured to determine a second target battery cluster in which an inhibitor is in the normal state from other battery clusters except the first target battery cluster.

The controlling module 404 is configured to switch on a solenoid valve of an isolation-and-suppression device B in the second target battery cluster, to let the inhibitor in the isolation-and-suppression device B be conveyed to the first target battery cluster through a pipeline to solve thermal runaway.

The detecting module 401, the first determining module 402, the second determining module 403, and the controlling module 404 may be unit modules in the same device (such as an energy storage container or a control host), or may be unit modules in different devices.

In a possible implementation, after the inhibitor in the isolation-and-suppression device B is conveyed to the first target battery cluster through the pipeline to solve thermal runaway, the controlling module 404 is further configured to: set a data reading priority of a detector group in the first target battery cluster as a highest priority; read environmental data of the detector group in the first target battery cluster preferentially based on the data reading priority; monitor whether thermal runaway of the first target battery cluster keeps continuous according to the environmental data in the first target battery cluster; when thermal runaway of the first target battery cluster keeps continuous, determine a third target battery cluster in which an inhibitor is in the normal state from other battery clusters except the first target battery cluster and the second target battery cluster; and switch on a solenoid valve of an isolation-and-suppression device C in the third target battery cluster, to let the inhibitor in the isolation-and-suppression device C be conveyed to the first target battery cluster through the pipeline to solve thermal runaway.

In a possible implementation, the controlling module 404 is further configured to: switch on a solenoid valve of the isolation-and-suppression device A when the inhibitor in the isolation-and-suppression device A is in the normal state, to solve thermal runaway of the first target battery cluster by the inhibitor in the isolation-and-suppression device A. After thermal runaway of the first target battery cluster is solved by the inhibitor in the isolation-and-suppression device A, the controlling module 404 is further configured to: set a data reading priority of a detector group in the first target battery cluster as a highest priority; read environmental data of the detector group in the first target battery cluster preferentially based on the data reading priority; monitor whether thermal runaway of the first target battery cluster keeps continuous according to the environmental data in the first target battery cluster; and when thermal runaway of the first target battery cluster keeps continuous, determine the second target battery cluster in which the inhibitor is in the normal state from the other battery clusters except the first target battery cluster, and switch on the solenoid valve of the isolation-and-suppression device B in the second target battery cluster to let the inhibitor in the isolation-and-suppression device B be conveyed to the first target battery cluster through the pipeline to solve thermal runaway.

In a possible implementation, the environmental data includes temperature data. In terms of determining the second target battery cluster in which the inhibitor is in the normal state from the other battery clusters except the first target battery cluster, the controlling module 404 is further configured to: for each battery cluster among the other battery clusters except the first target battery cluster, obtain a probability of thermal runaway of said each battery cluster in a next period based on temperature data of said each battery cluster in a current period and temperature data of said each battery cluster in a historical period; obtain a confidence score for an isolation-and-suppression device in said each battery cluster supporting the first target battery cluster, according to the probability of thermal runaway of said each battery cluster in the next period, and a pipeline length between the isolation-and-suppression device in said each battery cluster and a spraying device for the inhibitor in the first target battery cluster; and determine a battery cluster in which an inhibitor is in the normal state and which has a lowest confidence score among the other battery clusters except the first target battery cluster, as the second target battery cluster.

In a possible implementation, in terms of obtaining the probability of thermal runaway of said each battery cluster in the next period based on the temperature data of said each battery cluster in the current period and the temperature data of said each battery cluster in the historical period, the controlling module 404 is specifically configured to: predict temperature data of said each battery cluster in the next period by using the temperature data of said each battery cluster in the current period and the temperature data of said each battery cluster in the historical period; and obtain the probability of thermal runaway of said each battery cluster in the next period based on the temperature data of said each battery cluster in the next period and a first preset temperature value, where the first preset temperature value is a battery self-heating temperature T1.

In a possible implementation, the controlling module 404 is further configured to: determine whether thermal runaway occurs in said each battery cluster based on the temperature data of said each battery cluster in the current period and the first preset temperature value; and when no thermal runaway occurs in said each battery cluster, obtain the probability of thermal runaway of said each battery cluster in the next period based on the temperature data of said each battery cluster in the current period and the temperature data of said each battery cluster in the historical period; or when thermal runaway occurs in a battery cluster among the other battery clusters except the first target battery cluster in the current period, filter out the battery cluster in which thermal runaway occurs, and determine the second target battery cluster from remaining battery clusters.

In a possible implementation, the controlling module 404 is further configured to: generate a first-level early warning signal, when temperature data in the current period of the battery cluster in which thermal runaway occurs is greater than or equal to the first preset temperature value and less than a second preset temperature value; generate a second-level early warning signal, when the temperature data in the current period of the battery cluster in which thermal runaway occurs is greater than or equal to the second preset temperature value and less than a third preset temperature value, where the second preset temperature value is a trigger temperature T2 of thermal runaway, and the third preset temperature value is a maximum temperature T3 during thermal runaway; or generate a third-level early warning signal, when the temperature data in the current period of the battery cluster in which thermal runaway occurs is greater than or equal to the third preset temperature value.

In a possible implementation, said each of the multiple isolation-and-suppression devices is provided with a pressure switch, the first determining module 402 is further configured to: obtain pressure data reported by the pressure switch; and determine that an inhibitor in a corresponding isolation-and-suppression device is in the normal state, when the pressure data is greater than or equal to a preset pressure value; or determine that the inhibitor in the corresponding isolation-and-suppression device is in the abnormal state, when the pressure data is less than the preset pressure value.

For the implementation of each unit module in the linkage control system 100 for battery clusters, reference can be made to related descriptions in implementations illustrated in FIG. 1, and the same or similar beneficial effects can be achieved.

The detecting module 401 may be a sensor, such as any of a temperature sensor, a temperature detector, a humidity detector, a smoke detector, and a gas detector, or a combination thereof. The first determining module 402, the second determining module 403, the controlling module 404 each may be, a processor or a controller (for example, a central processing unit (CPU)), a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like.

Figure 5:
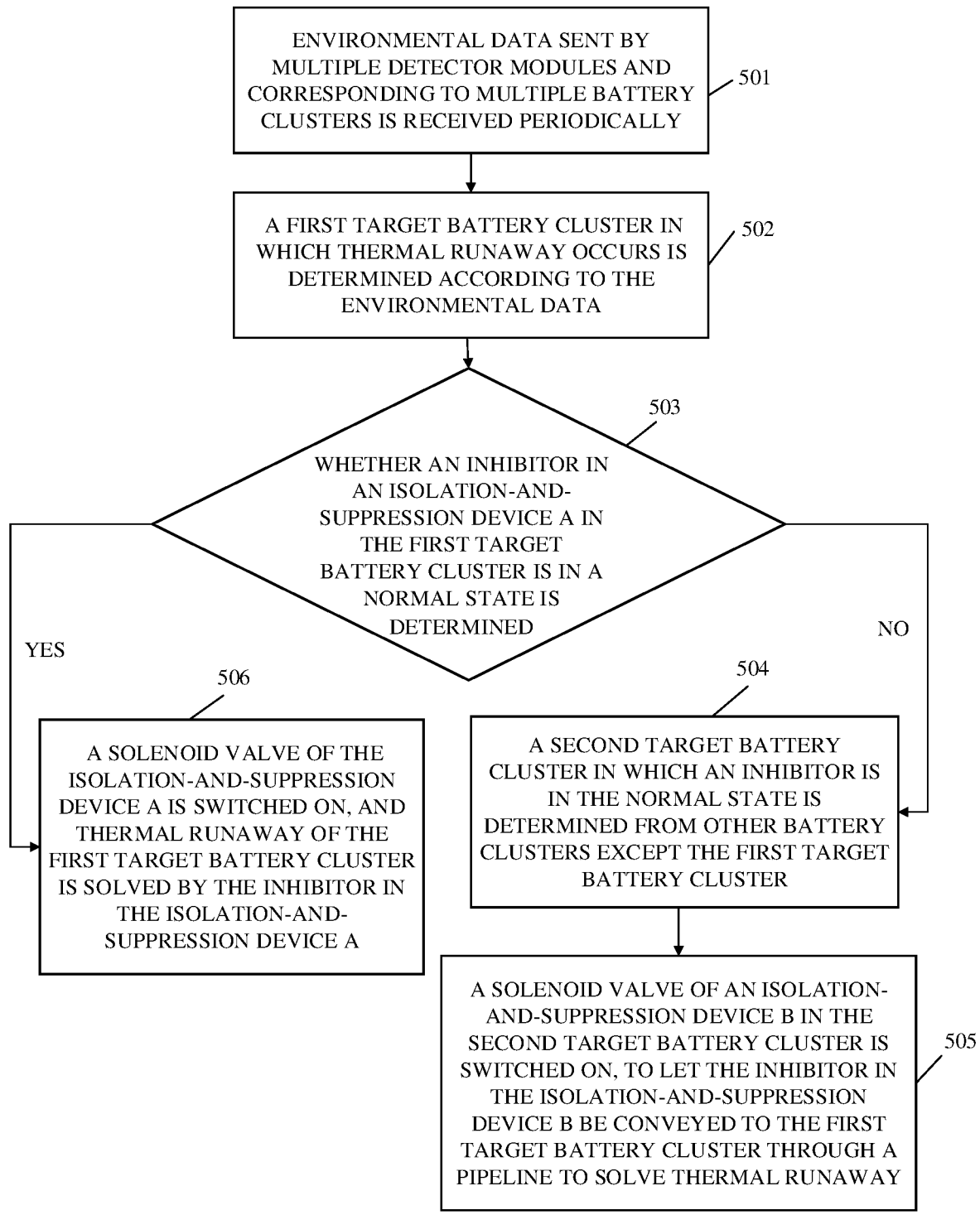
FIG. 5 is a schematic flowchart of a linkage control method for battery clusters provided in implementations of the disclosure.

Based on the descriptions of the above system implementations, a linkage control method for battery clusters is further provided in implementations of the disclosure. Reference is made to FIG. 5, which is a schematic flowchart of a linkage control method for battery clusters provided in implementations of the disclosure. The method can be applied to a linkage control system for battery clusters. As illustrated in FIG. 5, the method can include operations at 501-506.

At 501, environmental data sent by multiple detector modules and corresponding to multiple battery clusters is received periodically.

The multiple detector modules respectively correspond to the multiple battery clusters.

At 502, a first target battery cluster in which thermal runaway occurs is determined according to the environmental data.

At 503, whether an inhibitor in an isolation-and-suppression device A in the first target battery cluster is in a normal state is determined. If the inhibitor in the isolation-and-suppression device A is in an abnormal state, operation at 504 is executed; if the inhibitor in the isolation-and-suppression device A is in the normal state, operation at 506 is executed.

At 504, a second target battery cluster in which an inhibitor is in the normal state is determined from other battery clusters except the first target battery cluster.

At 505, a solenoid valve of an isolation-and-suppression device B in the second target battery cluster is switched on, to let the inhibitor in the isolation-and-suppression device B be conveyed to the first target battery cluster through a pipeline to solve thermal runaway.

At 506, a solenoid valve of the isolation-and-suppression device A is switched on, and thermal runaway of the first target battery cluster is solved by the inhibitor in the isolation-and-suppression device A.

For the implementation of each operation at 501-506, reference can be made to related descriptions in implementations illustrated in FIG. 1, and the same or similar beneficial effects can be achieved.

In a possible implementation, said each of the multiple detector modules includes a detector group consisting of at least one of a temperature detector, a humidity detector, a smoke detector, or a gas detector. After the inhibitor in the isolation-and-suppression device B is conveyed to the first target battery cluster through the pipeline to solve thermal runaway, the method further includes the following. A data reading priority of a detector group in the first target battery cluster is set as a highest priority. Environmental data reported by the detector group in the first target battery cluster is read preferentially based on the data reading priority, when multiple sets of environmental data reported by multiple detector groups are received. Whether thermal runaway of the first target battery cluster keeps continuous is monitored according to the environmental data reported by the detector group in the first target battery cluster. When thermal runaway of the first target battery cluster keeps continuous, a third target battery cluster in which an inhibitor is in the normal state is determined from other battery clusters except the first target battery cluster and the second target battery cluster. And a solenoid valve of an isolation-and-suppression device C in the third target battery cluster is switched on, to let the inhibitor in the isolation-and-suppression device C be conveyed to the first target battery cluster through the pipeline to solve thermal runaway.

In a possible implementation, after thermal runaway of the first target battery cluster is solved by the inhibitor in the isolation-and-suppression device A, the method further includes the following. A data reading priority of a detector group in the first target battery cluster is set as a highest priority. Environmental data reported by the detector group in the first target battery cluster is read preferentially based on the data reading priority, when multiple sets of environmental data reported by multiple detector groups are received. Whether thermal runaway of the first target battery cluster keeps continuous is monitored according to the environmental data reported by the detector group in the first target battery cluster. When thermal runaway of the first target battery cluster keeps continuous, the second target battery cluster is determined from the other battery clusters except the first target battery cluster, and the solenoid valve of the isolation-and-suppression device B in the second target battery cluster is switched on to let the inhibitor in the isolation-and-suppression device B be conveyed to the first target battery cluster through the pipeline to solve thermal runaway.

In a possible implementation, the environmental data includes temperature data. The second target battery cluster in which the inhibitor is in the normal state is determined from the other battery clusters except the first target battery cluster as follows. For each battery cluster among the other battery clusters except the first target battery cluster, a probability of thermal runaway of said each battery cluster in a next period is obtained based on temperature data of said each battery cluster in a current period and temperature data of said each battery cluster in a historical period; a confidence score for an isolation-and-suppression device in said each battery cluster supporting the first target battery cluster is obtained, according to the probability of thermal runaway of said each battery cluster in the next period, and a pipeline length between the isolation-and-suppression device in said each battery cluster and a spraying device for the inhibitor in the first target battery cluster; and a battery cluster in which an inhibitor is in the normal state and which has a lowest confidence score among the other battery clusters except the first target battery cluster is determined as the second target battery cluster.

In a possible implementation, the probability of thermal runaway of said each battery cluster in the next period is obtained based on the temperature data of said each battery cluster in the current period and the temperature data of said each battery cluster in the historical period as follows. Temperature data of said each battery cluster in the next period is predicted by using the temperature data of said each battery cluster in the current period and the temperature data of said each battery cluster in the historical period; the probability of thermal runaway of said each battery cluster in the next period is obtained based on the temperature data of said each battery cluster in the next period and a first preset temperature value, where the first preset temperature value is a battery self-heating temperature T1.

In a possible implementation, the method further includes the following. Whether thermal runaway occurs in said each battery cluster is determined based on the temperature data of said each battery cluster in the current period and the first preset temperature value; and when no thermal runaway occurs in said each battery cluster, the probability of thermal runaway of said each battery cluster in the next period is obtained based on the temperature data of said each battery cluster in the current period and the temperature data of said each battery cluster in the historical period; or when thermal runaway occurs in a battery cluster among the other battery clusters except the first target battery cluster in the current period, the battery cluster in which thermal runaway occurs is filtered out, and the second target battery cluster is determined from remaining battery clusters.

In a possible implementation, the method further includes the following. A control host generates a first-level early warning signal, when temperature data in the current period of the battery cluster in which thermal runaway occurs is greater than or equal to the first preset temperature value and less than a second preset temperature value; the control host generates a second-level early warning signal, when the temperature data in the current period of the battery cluster in which thermal runaway occurs is greater than or equal to the second preset temperature value and less than a third preset temperature value, where the second preset temperature value is a trigger temperature T2 of thermal runaway, and the third preset temperature value is a maximum temperature T3 during thermal runaway; or the control host generates a third-level early warning signal, when the temperature data in the current period of the battery cluster in which thermal runaway occurs is greater than or equal to the third preset temperature value.

In a possible implementation, each isolation-and-suppression device is provided with a pressure switch, and the method further includes the following. Pressure data reported by the pressure switch is obtained; and it is determined that an inhibitor in a corresponding isolation-and-suppression device is in the normal state, when the pressure data is greater than or equal to a preset pressure value; or it is determined that the inhibitor in the corresponding isolation-and-suppression device is in the abnormal state, when the pressure data is less than the preset pressure value.

A non-transitory computer readable storage medium (memory) is further provided in implementations of the disclosure. The non-transitory computer readable storage medium is a memory device in each device, and is configured to store a computer program executed by the device. When the computer program runs on the device, the method illustrated in FIG. 5 can be realized. It can be understood that, the computer readable storage medium herein may include an internal storage medium in each device, and may also include an extended storage medium supported by each device. The non-transitory computer readable storage medium provides a storage space in which operating systems of various devices are stored. Moreover, one or more computer programs suitable for being loaded and executed by a processor are also stored in the storage space. It should be noted that, the computer readable storage medium herein may be a high-speed random access memory (RAM) or a non-volatile memory, such as at least one disk memory, alternatively, it may also be at least one computer readable storage medium located far away from the foregoing processor.

A computer program product is further provided in implementations of the disclosure. When the computer program product is run by the device, the method illustrated in FIG. 5 can be realized.

In the foregoing implementations, the description of each implementation has its own emphasis. For the parts not described in detail in one implementation, reference may be made to related descriptions in other implementations.

It can be understood that, the processor in implementations of the disclosure may be a central processing unit (CPU), and may also be a general-purpose processor, a digital signal processor (DSP), an application specific integrated circuit (ASIC), a field programmable gate array (FPGA), or other programming logic devices, discrete gate or transistor logic devices, discrete hardware components or the like. The general-purpose processor may be a microprocessor or the processor may be any conventional processor or the like.

It can be understood that, the memory in implementations of the disclosure may be a volatile memory or a non-volatile memory, or may include both volatile and non-volatile memory. The non-volatile memory may be a read-only memory (ROM), a programmable read-only memory (PROM), an erasable programmable read-only memory (EPROM), an electrically erasable programmable read-only memory (EEPROM) or flash memory. The volatile memory may be a RAM, which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DRRAM).

It should be noted that, when the processor is a general-purpose processor, DSP, ASIC, FPGA or other programming logic devices, discrete gate or transistor logic devices, discrete hardware components, the memory (memory module) is integrated into the processor.

It should be noted that the memory described herein is intended to include, but is not limited to, these and any other suitable types of memory.

It should be understood that, in various implementations of the disclosure, the magnitude of the sequence numbers of the above processes does not mean the order of execution. The order of execution of each process should be determined by its function and internal logic, and should not constitute any limitation to the implementation process of implementations of the disclosure.

It will be appreciated that the systems, apparatuses, and methods disclosed in various implementations of the disclosure may be implemented in various other manners. For example, the above apparatus implementations are merely illustrative, e.g., the division of units is only a division of logical functions, and other manners of division may also available in practice, e.g., multiple units or assemblies may be combined or may be integrated into another system, or some features may be ignored or omitted. In other respects, the coupling or direct coupling or communication connection as illustrated or discussed may be an indirect coupling or communication connection through some interfaces, devices or units, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the implementations.

In addition, in various implementations of the disclosure, the various functional units may be integrated into one processing unit, or each unit may be physically present, or two or more units may be integrated into one unit. The integrated unit may be stored in a computer readable storage medium when it is implemented in the form of a software functional unit and is sold or used as a separate product.

In the disclosure, "at least one" refers to one or more, and "multiple" refers to two or more. The term "and/or" herein only describes an association relationship between associated objects, which means that there may be three relationships. For example, A and/or B can mean A alone, both A and B exist, and B alone, where A and B can be singular or plural. In addition, the character "/" in the disclosure, unless otherwise specified, generally indicates that the associated objects are in an "or" relationship.

The steps in the method of implementations in the disclosure can be adjusted, combined and deleted according to the practical needs.

The modules in the device of implementations in the disclosure can be merged, divided and deleted according to the practical needs.

As described above, the above implementations are only used to illustrate, but not to limit the technical solutions of the disclosure. Although the disclosure has been described in detail with reference to the foregoing implementations, those of ordinary skill in the art should understand that, they can still modify the technical solutions described in the foregoing implementations or replace some technical features equally. However, these modifications or replacements do not make the essence of the corresponding technical solutions deviate from the scope of the technical solutions of implementations in the disclosure.

What is claimed is:

1. A linkage control system for battery clusters, comprising a plurality of detector modules, a plurality of isolation-and-suppression devices, and a control host, wherein
   the plurality of isolation-and-suppression devices are respectively disposed in the battery clusters, each of the plurality of isolation-and-suppression devices is provided with a solenoid valve, and the plurality of isolation-and-suppression devices are connected by a pipeline;
   the plurality of detector modules are respectively mounted in the battery clusters, and each of the plurality of detector modules is configured to detect environmental data of battery modules in a corresponding battery cluster and periodically report the environmental data; and
   the control host is configured to determine a first target battery cluster in which thermal runaway occurs according to the environmental data, and determine whether an inhibitor in an isolation-and-suppression device A in the first target battery cluster is in a normal state, wherein when the inhibitor in the isolation-and-suppression device A is in an abnormal state, the control host is configured to determine a second target battery cluster in which an inhibitor is in the normal state from other battery clusters except the first target battery cluster, and switch on a solenoid valve of an isolation-and-suppression device B in the second target battery cluster to let the inhibitor in the isolation-and-suppression device B be conveyed to the first target battery cluster through the pipeline to solve thermal runaway;
   wherein the environmental data comprises temperature data, and in terms of determining the second target battery cluster in which the inhibitor is in the normal state from the other battery clusters except the first target battery cluster, the control host is configured to:
   for each battery cluster among the other battery clusters except the first target battery cluster, obtain a probability of thermal runaway of said each battery cluster in a next period based on temperature data of said each battery cluster in a current period and temperature data of said each battery cluster in a historical period;
   obtain a confidence score for an isolation-and-suppression device in said each battery cluster supporting the first target battery cluster, according to the probability of thermal runaway of said each battery cluster in the next period, and a pipeline length between the isolation-and-suppression device in said each battery cluster and a spraying device for the inhibitor in the first target battery cluster; and
   determine a battery cluster in which an inhibitor is in the normal state and which has a lowest confidence score among the other battery clusters except the first target battery cluster, as the second target battery cluster;
   wherein in terms of obtaining the probability of thermal runaway of said each battery cluster in the next period based on the temperature data of said each battery cluster in the current period and the temperature data of said each battery cluster in the historical period, the control host is configured to:

predict temperature data of said each battery cluster in the next period by using the temperature data of said each battery cluster in the current period and the temperature data of said each battery cluster in the historical period; and obtain the probability of thermal runaway of said each battery cluster in the next period based on the temperature data of said each battery cluster in the next period and a first preset temperature value, wherein the first preset temperature value is a battery self-heating temperature T1.

2. The system of claim 1, wherein said each of the plurality of detector modules comprises a detector group consisting of at least one of a temperature detector, a humidity detector, a smoke detector, or a gas detector, and after the inhibitor in the isolation-and-suppression device B is conveyed to the first target battery cluster through the pipeline to solve thermal runaway, the control host is further configured to:

set a data reading priority of a detector group in the first target battery cluster as a highest priority;

read environmental data reported by the detector group in the first target battery cluster preferentially based on the data reading priority, when receiving a plurality of sets of environmental data reported by a plurality of detector groups;

monitor whether thermal runaway of the first target battery cluster keeps continuous according to the environmental data reported by the detector group in the first target battery cluster:

when thermal runaway of the first target battery cluster keeps continuous, determine a third target battery cluster in which an inhibitor is in the normal state from other battery clusters except the first target battery cluster and the second target battery cluster; and switch on a solenoid valve of an isolation-and-suppression device C in the third target battery cluster, to let the inhibitor in the isolation-and-suppression device C be conveyed to the first target battery cluster through the pipeline to solve thermal runaway.

3. The system of claim 1, wherein the control host is further configured to switch on a solenoid valve of the isolation-and-suppression device A when the inhibitor in the isolation-and-suppression device A is in the normal state, to solve thermal runaway of the first target battery cluster by the inhibitor in the isolation-and-suppression device A; and said each of the plurality of detector modules comprises a detector group consisting of at least one of a temperature detector, a humidity detector, a smoke detector, or a gas detector, and after thermal runaway of the first target battery cluster is solved by the inhibitor in the isolation-and-suppression device A, the control host is further configured to:

set a data reading priority of a detector group in the first target battery cluster as a highest priority;

read environmental data reported by the detector group in the first target battery cluster preferentially based on the data reading priority, when receiving a plurality of sets of environmental data reported by a plurality of detector groups;

monitor whether thermal runaway of the first target battery cluster keeps continuous according to the environmental data reported by the detector group in the first target battery cluster; and when thermal runaway of the first target battery cluster keeps continuous, determine the second target battery cluster from the other battery clusters except the first target battery cluster, and switch on the solenoid valve of the isolation-and-suppression device B in the second target battery cluster to let the inhibitor in the isolation-and-suppression device B be conveyed to the first target battery cluster through the pipeline to solve thermal runaway.

4. The system of claim 1, wherein the control host is further configured to:

determine whether thermal runaway occurs in said each battery cluster based on the temperature data of said each battery cluster in the current period and the first preset temperature value; and when no thermal runaway occurs in said each battery cluster, obtain the probability of thermal runaway of said each battery cluster in the next period based on the temperature data of said each battery cluster in the current period and the temperature data of said each battery cluster in the historical period; or when thermal runaway occurs in a battery cluster among the other battery clusters except the first target battery cluster in the current period, filter out the battery cluster in which thermal runaway occurs, and determine the second target battery cluster from remaining battery clusters.

5. The system of claim 4, wherein the control host is further configured to:

generate a first-level early warning signal, when temperature data in the current period of the battery cluster in which thermal runaway occurs is greater than or equal to the first preset temperature value and less than a second preset temperature value;

generate a second-level early warning signal, when the temperature data in the current period of the battery cluster in which thermal runaway occurs is greater than or equal to the second preset temperature value and less than a third preset temperature value, wherein the second preset temperature value is a trigger temperature T2 of thermal runaway, and the third preset temperature value is a maximum temperature T3 during thermal runaway; or generate a third-level early warning signal, when the temperature data in the current period of the battery cluster in which thermal runaway occurs is greater than or equal to the third preset temperature value.

6. The system of claim 1, wherein said each of the plurality of isolation-and-suppression devices is provided with a pressure switch, and the control host is further configured to:

obtain pressure data reported by the pressure switch; and determine that an inhibitor in a corresponding isolation-and-suppression device is in the normal state, when the pressure data is greater than or equal to a preset pressure value; or determine that the inhibitor in the corresponding isolation-and-suppression device is in the abnormal state, when the pressure data is less than the preset pressure value.

7. The system of claim 2, wherein said each of the plurality of isolation-and-suppression devices is provided with a pressure switch, and the control host is further configured to:

obtain pressure data reported by the pressure switch; and determine that an inhibitor in a corresponding isolation-and-suppression device is in the normal state, when the pressure data is greater than or equal to a preset pressure value; or determine that the inhibitor in the corresponding isolation-and-suppression device is in the abnormal state, when the pressure data is less than the preset pressure value.

8. The system of claim 3, wherein said each of the plurality of isolation-and-suppression devices is provided with a pressure switch, and the control host is further configured to:
obtain pressure data reported by the pressure switch; and
determine that an inhibitor in a corresponding isolation-and-suppression device is in the normal state, when the pressure data is greater than or equal to a preset pressure value; or
determine that the inhibitor in the corresponding isolation-and-suppression device is in the abnormal state, when the pressure data is less than the preset pressure value.

9. The system of claim 4, wherein said each of the plurality of isolation-and-suppression devices is provided with a pressure switch, and the control host is further configured to:
obtain pressure data reported by the pressure switch; and
determine that an inhibitor in a corresponding isolation-and-suppression device is in the normal state, when the pressure data is greater than or equal to a preset pressure value; or
determine that the inhibitor in the corresponding isolation-and-suppression device is in the abnormal state, when the pressure data is less than the preset pressure value.

10. The system of claim 5, wherein said each of the plurality of isolation-and-suppression devices is provided with a pressure switch, and the control host is further configured to:
obtain pressure data reported by the pressure switch; and
determine that an inhibitor in a corresponding isolation-and-suppression device is in the normal state, when the pressure data is greater than or equal to a preset pressure value; or
determine that the inhibitor in the corresponding isolation-and-suppression device is in the abnormal state, when the pressure data is less than the preset pressure value.

11. A linkage control method for the battery clusters, applied to the linkage control system for the battery clusters of claim 1, comprising:
receiving periodically the environmental data sent by the plurality of detector modules and corresponding to the battery clusters, wherein the plurality of detector modules respectively correspond to the battery clusters;
determining, by the control host, the first target battery cluster in which thermal runaway occurs according to the environmental data, and determining whether the inhibitor in the isolation-and-suppression device A in the first target battery cluster is in the normal state;
determining, by the control host, the second target battery cluster in which the inhibitor is in the normal state from the other battery clusters except the first target battery cluster, when the inhibitor in the isolation-and-suppression device A is in the abnormal state; and
switching on, by the control host, the solenoid valve of the isolation-and-suppression device B in the second target battery cluster, to let the inhibitor in the isolation-and-suppression device B be conveyed to the first target battery cluster through the pipeline to solve thermal runaway;

wherein the environmental data comprises the temperature data, and determining the second target battery cluster in which the inhibitor is in the normal state from the other battery clusters except the first target battery cluster comprises:
for each battery cluster among the other battery clusters except the first target battery cluster, obtaining the probability of thermal runaway of said each battery cluster in the next period based on the temperature data of said each battery cluster in the current period and the temperature data of said each battery cluster in the historical period;
obtaining the confidence score for the isolation-and-suppression device in said each battery cluster supporting the first target battery cluster, according to the probability of thermal runaway of said each battery cluster in the next period, and the pipeline length between the isolation-and-suppression device in said each battery cluster and the spraying device for the inhibitor in the first target battery cluster; and
determining the battery cluster in which the inhibitor is in the normal state and which has the lowest confidence score among the other battery clusters except the first target battery cluster, as the second target battery cluster;
wherein obtaining the probability of thermal runaway of said each battery cluster in the next period based on the temperature data of said each battery cluster in the current period and the temperature data of said each battery cluster in the historical period comprises:
predicting the temperature data of said each battery cluster in the next period by using the temperature data of said each battery cluster in the current period and the temperature data of said each battery cluster in the historical period; and
obtaining the probability of thermal runaway of said each battery cluster in the next period based on the temperature data of said each battery cluster in the next period and the first preset temperature value, wherein the first preset temperature value is the battery self-heating temperature T1.

12. A linkage control system for battery clusters, comprising a detecting module, a first determining module, a second determining module, and a controlling module, wherein
the detecting module is configured to detect environmental data of battery modules in a corresponding battery cluster and periodically report the environmental data;
the first determining module is configured to determine a first target battery cluster in which thermal runaway occurs according to the environmental data, and determine whether an inhibitor in an isolation-and-suppression device A in the first target battery cluster is in a normal state;
when the inhibitor in the isolation-and-suppression device A in the first target battery cluster is in an abnormal state, the second determining module is configured to determine a second target battery cluster in which an inhibitor is in the normal state from other battery clusters except the first target battery cluster; and
the controlling module is configured to switch on a solenoid valve of an isolation-and-suppression device B in the second target battery cluster, to let the inhibitor in the isolation-and-suppression device B be conveyed to the first target battery cluster through a pipeline to solve thermal runaway;

wherein the environmental data comprises temperature data, and in terms of determining the second target battery cluster in which the inhibitor is in the normal state from the other battery clusters except the first target battery cluster, the controlling module is configured to:

for each battery cluster among the other battery clusters except the first target battery cluster, obtain a probability of thermal runaway of said each battery cluster in a next period based on temperature data of said each battery cluster in a current period and temperature data of said each battery cluster in a historical period;

obtain a confidence score for an isolation-and-suppression device in said each battery cluster supporting the first target battery cluster, according to the probability of thermal runaway of said each battery cluster in the next period, and a pipeline length between the isolation-and-suppression device in said each battery cluster and a spraying device for the inhibitor in the first target battery cluster; and determine a battery cluster in which an inhibitor is in the normal state and which has a lowest confidence score among the other battery clusters except the first target battery cluster, as the second target battery cluster;

wherein in terms of obtaining the probability of thermal runaway of said each battery cluster in the next period based on the temperature data of said each battery cluster in the current period and the temperature data of said each battery cluster in the historical period, the controlling module is configured to:

predict temperature data of said each battery cluster in the next period by using the temperature data of said each battery cluster in the current period and the temperature data of said each battery cluster in the historical period; and obtain the probability of thermal runaway of said each battery cluster in the next period based on the temperature data of said each battery cluster in the next period and a first preset temperature value, wherein the first preset temperature value is a battery self-heating temperature $T1$.

* * * * *